(12) United States Patent
Son et al.

(10) Patent No.: US 12,139,050 B2
(45) Date of Patent: Nov. 12, 2024

(54) SEAT FRAME FOR VEHICLE

(71) Applicant: HYUNDAI TRANSYS INCORPORATED, Seosan-si (KR)

(72) Inventors: Dong Hyeon Son, Hwaseong-si (KR); Woo Sool Song, Hwaseong-si (KR)

(73) Assignee: HYUNDAI TRANSYS INCORPORATED, Seosan-si (KR)

( * ) Notice: Subject to any disclaimer, the term of this patent is extended or adjusted under 35 U.S.C. 154(b) by 147 days.

(21) Appl. No.: 17/960,209

(22) Filed: Oct. 5, 2022

(65) Prior Publication Data
US 2023/0107030 A1 Apr. 6, 2023

(30) Foreign Application Priority Data
Oct. 5, 2021 (KR) .................... 10-2021-0131898

(51) Int. Cl.
  *B60N 2/12* (2006.01)
  *B60N 2/14* (2006.01)
  *B60N 2/68* (2006.01)
  *B60N 2/90* (2018.01)
(52) U.S. Cl.
  CPC ............... *B60N 2/12* (2013.01); *B60N 2/146* (2013.01); *B60N 2/68* (2013.01); *B60N 2002/971* (2018.02)
(58) Field of Classification Search
  CPC . B60N 2/12; B60N 2/14; B60N 2/146; B60N 2002/126; B60N 2002/971; B60N 2/3047
  See application file for complete search history.

(56) References Cited

U.S. PATENT DOCUMENTS

| | | | | |
|---|---|---|---|---|
| 6,910,739 B2 * | 6/2005 | Grable | ............... | B60N 2/2354 296/65.09 |
| 7,025,422 B2 * | 4/2006 | Fast | ............... | B60N 2/2362 297/378.14 |
| 7,367,624 B2 * | 5/2008 | Garland | ............... | B60N 2/2352 296/65.09 |
| 7,871,127 B2 * | 1/2011 | Bruck | ............... | B60N 2/20 297/378.13 |
| 8,430,455 B2 * | 4/2013 | Douceau | ............... | B60N 2/34 297/378.12 |
| 8,439,444 B2 * | 5/2013 | Ngiau | ............... | B60N 2/12 297/331 |
| 9,233,627 B2 * | 1/2016 | Michalak | ............... | B60N 2/20 |
| 9,403,447 B2 * | 8/2016 | Elton | ............... | B60N 2/3011 |

(Continued)

FOREIGN PATENT DOCUMENTS

| | | | | |
|---|---|---|---|---|
| DE | 102022103377 A1 * | 8/2023 | | |
| EP | 3243695 A1 * | 11/2017 | ............... | B60N 2/12 |

(Continued)

*Primary Examiner* — Timothy J Brindley
(74) *Attorney, Agent, or Firm* — Bridgeway IP Law Group, PLLC; Jihun Kim

(57) ABSTRACT

Disclosed is a seat frame for a vehicle, the seat frame including a back frame provided on a vehicle seat and including a rotary spring disposed at a lower end thereof, the rotary spring is configured to fold the vehicle seat forward when a lever operates, and a flat spring disposed at the lower end of the back frame and including a slider provided on a lower surface of the back frame and configured to fix the back frame so as to prevent the vehicle seat from being restored rearward when the vehicle seat is folded forward.

9 Claims, 5 Drawing Sheets

BEFORE FOLDING   DURING FOLDING   AFTER FOLDING

(56) References Cited

U.S. PATENT DOCUMENTS

| | | | |
|---|---|---|---|
| 11,427,110 B2 * | 8/2022 | Leighton | B60N 2/22 |
| 2009/0079249 A1 * | 3/2009 | Nathan | B60N 2/2352 |
| | | | 297/378.1 |
| 2010/0109388 A1 * | 5/2010 | Habedank | B60N 2/20 |
| | | | 297/341 |
| 2012/0181833 A1 * | 7/2012 | Nock | B60N 2/12 |
| | | | 297/341 |
| 2019/0366880 A1 * | 12/2019 | Dill | B60N 2/12 |

FOREIGN PATENT DOCUMENTS

| | | | | |
|---|---|---|---|---|
| EP | 3254888 A1 * | 12/2017 | | B60N 2/12 |
| EP | 3915829 A1 * | 12/2021 | | B60N 2/12 |
| KR | 10-1999-0060957 A | 7/1999 | | |
| KR | 10-2011-0135535 A | 12/2011 | | |
| KR | 10-2012-0076243 A | 7/2012 | | |
| KR | 10-1575499 B1 | 12/2015 | | |
| KR | 10-2021-0067214 A | 6/2021 | | |

* cited by examiner

A-A

B-B

BEFORE FOLDING    DURING FOLDING    AFTER FOLDING

SEAT FRAME FOR VEHICLE

CROSS REFERENCE TO RELATED APPLICATION

The present application claims priority to Korean Patent Application No. 10-2021-0131898, filed Oct. 5, 2021, the entire contents of which is incorporated herein for all purposes by this reference.

BACKGROUND OF THE INVENTION

Field of the Invention

The present invention relates to a seat frame for a vehicle, and more particularly, to a seat frame for a vehicle that prevents a back frame from being restored rearward and fixed during an easy entry operation in a state in which a vehicle is placed on a slope.

Description of the Related Art

Recently, much research and development have been actively conducted on devices to make it easy for drivers to get in or out of vehicles, and one of the devices is an easy-entry recliner of a vehicle seat.

In the case of the easy entry in the related art, a rail is restored rearward to an initial position while pushing a seatback after an easy entry operation, and then the rail is fixed at the initial position. Thereafter, the back frame is restored rearward. However, if a spiral spring for folding the back frame forward is insufficient, the back frame is restored rearward and fixed before the rail is restored to the initial position, and then the rail is fixed.

There is a need for a seat frame that may be applied in common without being changed in shape. Further, it is necessary to improve performance in making it easy for a rear seat passenger to get in or out of the vehicle by preventing the back frame from being tilted rearward during the easy entry operation in a state in which the vehicle is placed on the slope. Further, there is a need for a solution for improving performance of an easy entry system by preventing a situation in which the recliner is restored first during a process of restoring the vehicle seat to an original state.

The foregoing explained as the background is intended merely to aid in the understanding of the background of the present invention, and is not intended to mean that the present invention falls within the purview of the related art that is already known to those skilled in the art.

Document of Related Art

SUMMARY OF THE INVENTION

The present invention is proposed to solve these problems and aims to provide a seat frame for a vehicle that prevents a back frame from being restored rearward and fixed during an easy entry operation in a state in which a vehicle is placed on a slope, thereby improving performance in making it easy for a rear seat passenger to get in or out of the vehicle. The present invention also aims to improve performance of an easy entry system by preventing a situation in which a recliner is restored first during a restoring process. The present invention also aims to provide a seat frame for a vehicle that may be applied in common to frames, to which easy entry is applied, without changing a structure of an easy entry module and a structure of a back frame.

To achieve the above-mentioned objects, the present invention provides a seat frame for a vehicle, the seat frame including: a back frame provided on a vehicle seat and including a rotary spring disposed at a lower end thereof, and configured to fold the vehicle seat forward when a lever operates; and a flat spring disposed at the lower end of the back frame and including a slider configured to fix the back frame, which is provided on a lower surface of the back frame, so as to prevent the vehicle seat from being restored rearward when the vehicle seat is folded forward.

The flat spring and the rotary spring may be disposed at each of two opposite ends of the back frame.

The flat spring may include: a sliding part on which the slider moves; and a fixing part to which the slider is fixed.

The fixing part may have a ring shape.

The back frame may fold the vehicle seat forward as the slider rotates counterclockwise on the sliding part.

The fixing part may fix the back frame so that the slider may be fixed, and the vehicle seat may be prevented to be restored rearward.

The lever may be disposed at an upper end of the vehicle seat, and when the lever operates, the back frame may be unfixed, and the vehicle seat may be folded forward by operation of the rotary spring.

The seat frame may further include a rail provided at a lower end of the vehicle seat and configured to allow the vehicle seat to slide and move forward when the vehicle seat is folded forward.

When the vehicle seat is folded forward, a locking cable of the rail may be released, and the vehicle seat may move forward while sliding on the rail.

The flat spring may be spaced apart from the slider and may not fix the back frame before the vehicle seat is folded forward.

The back frame moves and slides the vehicle seat rearward on the rail when the vehicle seat is restored to an initial position, and the vehicle seat may be restored rearward when the rail is stopped.

According to the present invention, the seat frame for a vehicle prevents the back frame from being restored rearward and fixed during the easy entry operation in the state in which the vehicle is placed on a slope, thereby improving performance in making it easy for a rear seat passenger to get in or out of the vehicle. In addition, it is possible to improve the performance of the easy entry system by preventing the situation in which the recliner is restored first during the restoring process. Further, the seat frame may be applied in common to the frames, to which the easy entry is applied, without changing the structure of the easy entry module and the structure of the back frame.

The effects obtained by the present invention are not limited to the aforementioned effects, and other effects, which are not mentioned above, will be clearly understood by those skilled in the art from the following description.

DETAILED DESCRIPTION OF THE INVENTION

Figure 1:
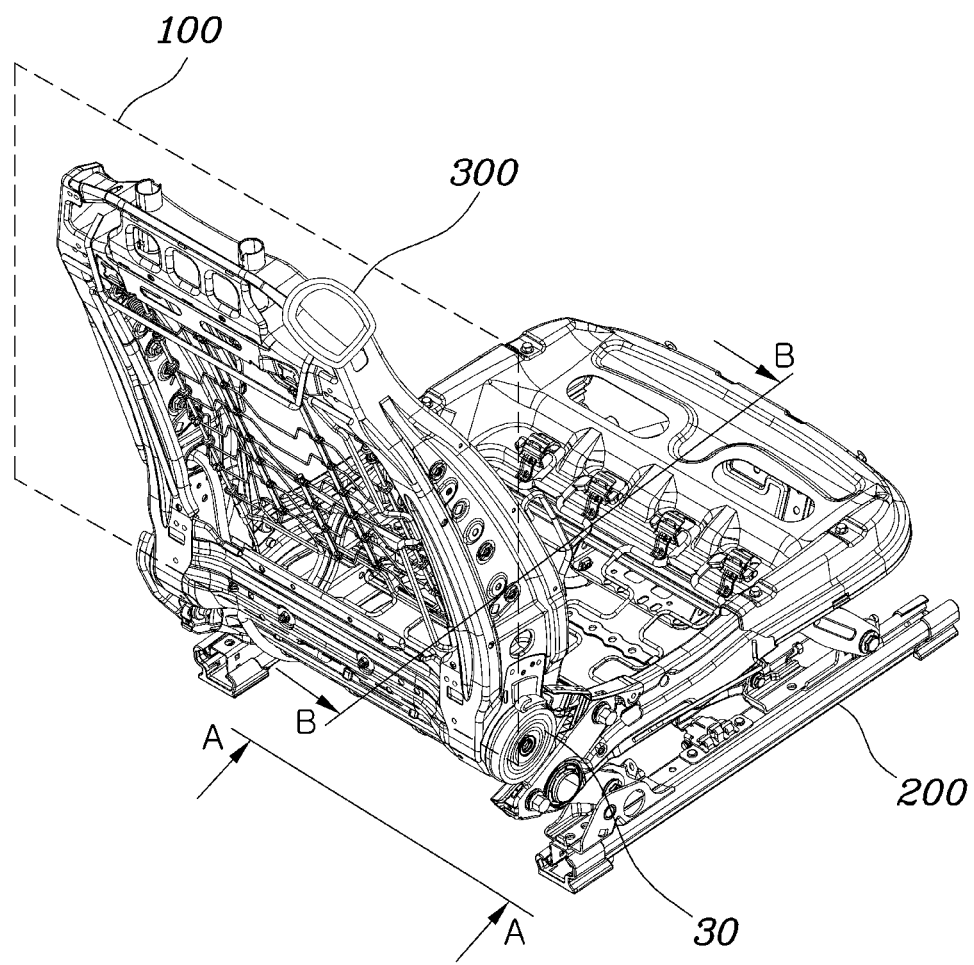
FIG. 1 is a view illustrating a seat frame for a vehicle according to an embodiment of the present invention.

Specific structural or functional descriptions of embodiments of the present invention disclosed in this specification or application are exemplified only for the purpose of explaining the embodiments according to the present invention, the embodiments according to the present invention may be carried out in various forms, and it should not be interpreted that the present invention is limited to the embodiments described in this specification or application.

Because the embodiments according to the present invention may be variously changed and may have various forms, specific embodiments will be illustrated in the drawings and described in detail in the present specification or application. However, the descriptions of the specific embodiments are not intended to limit embodiments according to the concept of the present invention to the specific embodiments, but it should be understood that the present invention covers all modifications, equivalents and alternatives falling within the spirit and technical scope of the present invention.

Unless otherwise defined, all terms used herein, including technical or scientific terms, have the same meaning as commonly understood by those skilled in the art to which the present invention pertains. The terms such as those defined in commonly used dictionaries should be interpreted as having meanings consistent with meanings in the context of related technologies and should not be interpreted as ideal or excessively formal meanings unless explicitly defined in the present specification.

Hereinafter, the present invention will be described in detail through description of preferred embodiments of the present invention with reference to the accompanying drawings. Like reference numerals indicated in the respective drawings refer to like members.

Figure 2A:
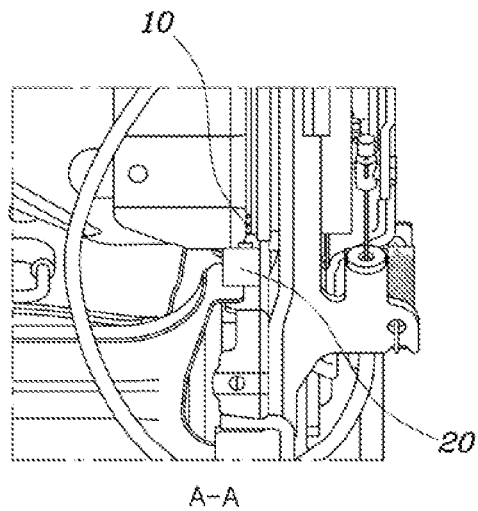
FIG. 2A is a cross-section taken along line A-A of the seat frame for a vehicle as shown in FIG. 1.
Figure 2B:
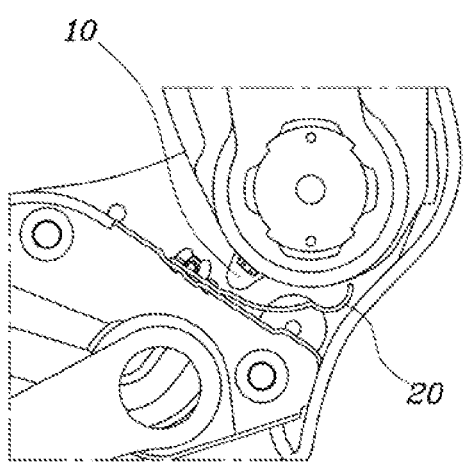
FIG. 2B is a cross-section taken along line B-B of the seat frame for a vehicle as shown in FIG. 1.

FIG. 1 is a view illustrating a seat frame for a vehicle according to an embodiment of the present invention. FIG. 2A is a cross-section taken along line A-A of the seat frame for a vehicle as shown in FIG. 1, and FIG. 2B is a cross-section taken along line B-B of the seat frame for a vehicle as shown in FIG. 1.

Figure 3:
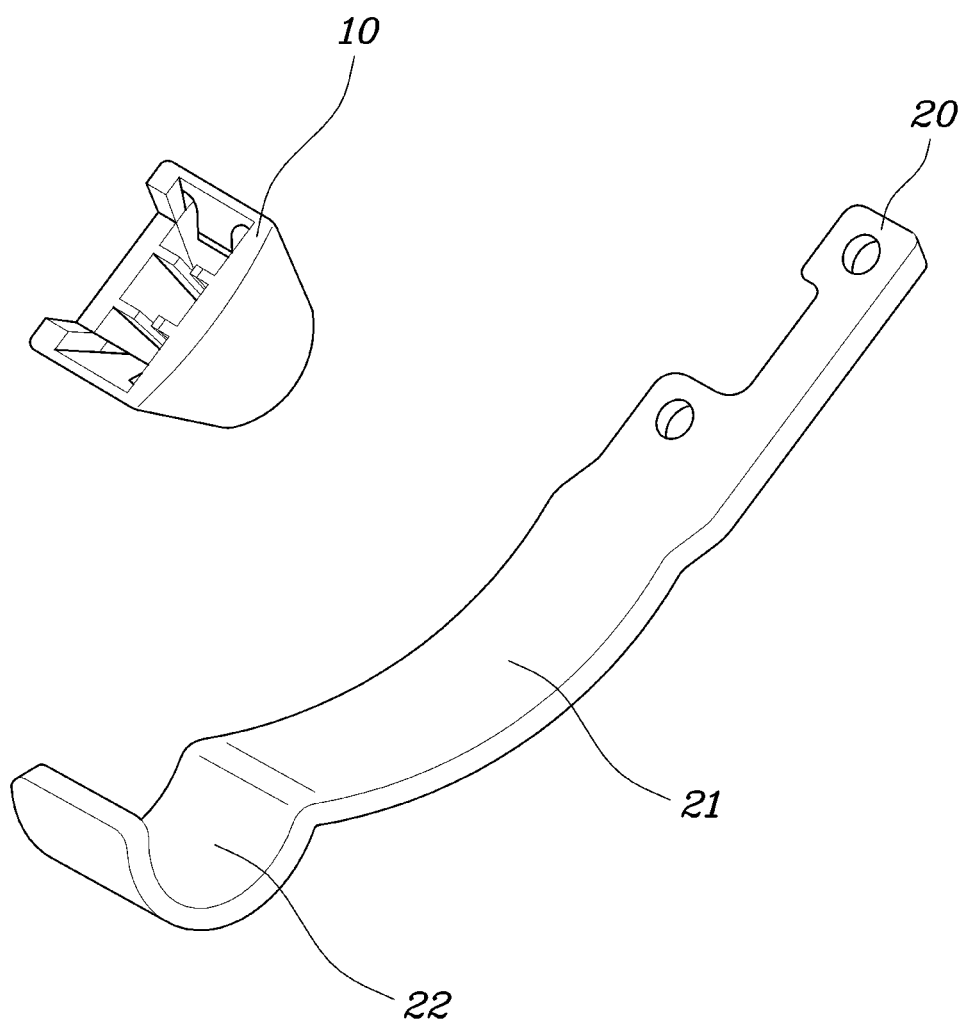
FIG. 3 is a view illustrating a flat spring and a slider for fixing a back frame.
Figure 4:
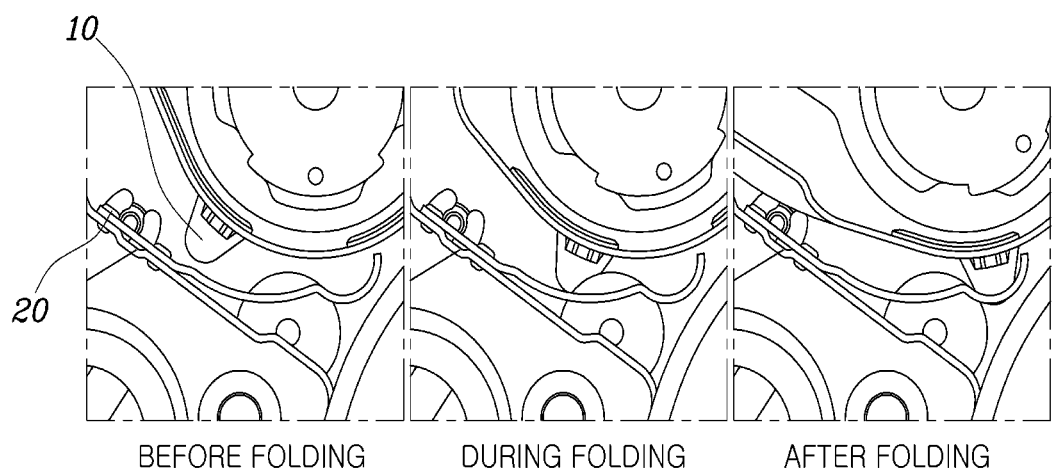
FIG. 4 is a view illustrating the flat spring and the slider before, while, and after a vehicle seat is folded forward.
Figure 5:
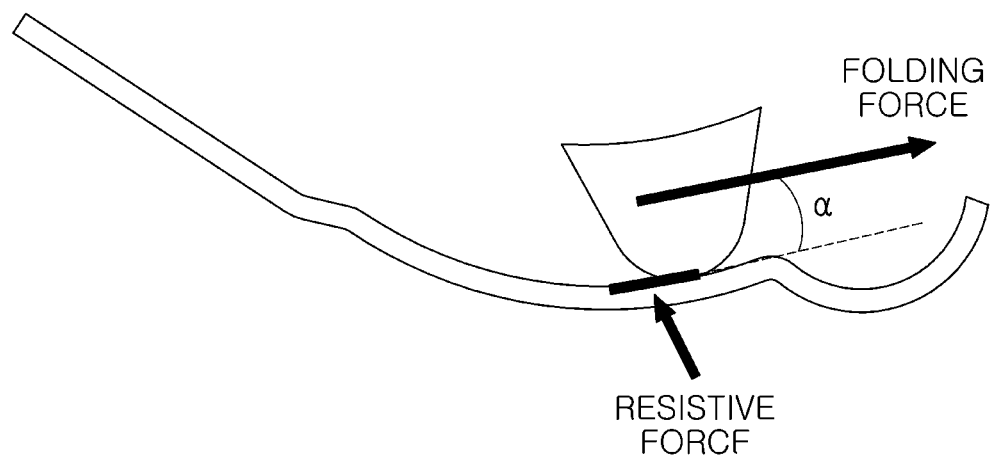
FIG. 5 is a view illustrating a load applied to the slider and the back frame while the vehicle seat is folded.
Figure 5:
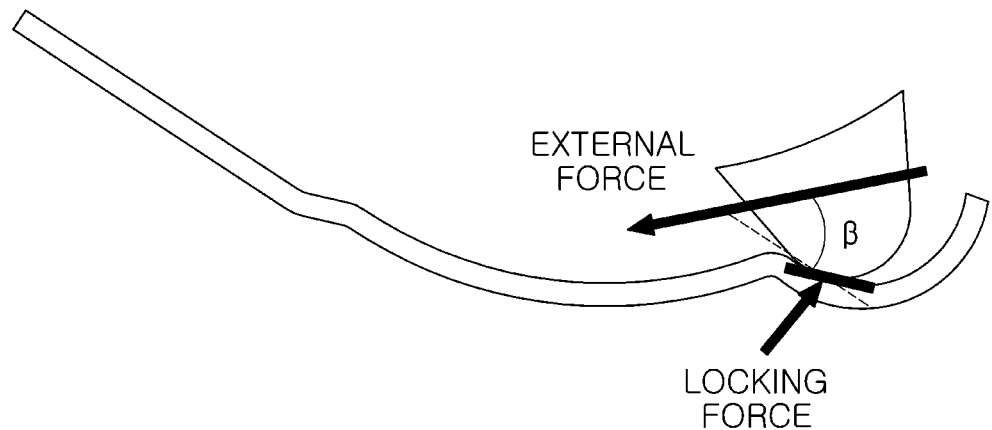

FIG. 3 is a view illustrating a flat spring and a slider for fixing a back frame. FIG. 4 is a view illustrating the flat spring and the slider before, while, and after a vehicle seat is folded forward. FIG. 5 is a view illustrating a load applied to the slider and the back frame when the vehicle seat is folded.

FIG. 1 is a view illustrating a seat frame for a vehicle according to an embodiment of the present invention.

Referring to FIG. 1, a seat frame for a vehicle includes: a back frame 100 provided on a vehicle seat and including a rotary spring 30 disposed at a lower end thereof, the rotary spring is configured to fold the vehicle seat forward when a lever 300 operates; and a flat spring 20 disposed at the lower end of the back frame 100 and including a slider provided on a lower surface of the back frame 100 and configured to fix the back frame 100 so as to prevent the vehicle seat from being restored rearward when the vehicle seat is folded forward.

The present invention is characterized by preventing the back frame 100 from being restored rearward and fixed during an easy entry operation in a state in which a vehicle is placed on a slope. In the case of manual easy entry, a rail 200 is restored rearward to an initial position while pushing a seatback after an easy entry operation, the rail 200 is fixed at the initial position, and then the back frame 100 is restored rearward.

Specifically, the back frame 100 is provided on the vehicle seat, and the rotary spring 30 is disposed at the lower end of the back frame 100. When the lever 300 operates, the vehicle seat may be folded forward by operation of the rotary spring 30. In general, a plurality of vehicle seats is provided in the vehicle so that a driver and passengers may be seated in the vehicle seats.

Referring to FIG. 1, a seat frame for a vehicle includes: a back frame 100 provided on a vehicle seat and including a rotary spring 30 disposed at a lower end thereof, the back frame 100 being configured to fold the vehicle seat forward by operation of the rotary spring 30 when a lever 300 operates; and a flat spring 20 disposed at the lower end of the back frame 100 and configured to fix the back frame 100 by means of a slider 10, which is provided on a lower surface of the back frame 100, to prevent the vehicle seat from being restored rearward when the vehicle seat is folded forward.

The present invention is characterized by preventing the back frame 100 from being restored rearward and fixed during an easy entry operation in a state in which a vehicle is placed on a slope. In the case of manual easy entry, a rail 200 is restored rearward to an initial position while pushing a seatback after an easy entry operation, the rail 200 is fixed at the initial position, and then the back frame 100 is restored rearward.

Specifically, the back frame 100 is provided on the vehicle seat, and the rotary spring 30 is disposed at the lower end of the back frame 100. When the lever 300 operates, the vehicle seat may be folded forward by operation of the rotary spring 30. In general, a plurality of vehicle seats is provided in the vehicle so that a driver and passengers may be seated in the vehicle seats.

FIG. 2A is a cross-section taken along line A-A of the seat frame for a vehicle as shown in FIG. 1, and FIG. 2B is a cross-section taken along line B-B of the seat frame for a vehicle as shown in FIG. 1.

The flat springs 20 and the rotary springs 30 are characterized by being disposed at two opposite ends of the back frame 100. The rotary spring 30 may assist in folding the back frame 100 and fix the back frame 100 so that the vehicle seat backrest may be in close contact with the vehicle seat support part. To allow the driver or passenger to be seated in the vehicle seat, the vehicle seat backrest needs to be maintained in a state before the vehicle seat backrest is folded, and the vehicle seat backrest needs to be fixed in position so as not to be folded in a direction toward the vehicle seat support part. Therefore, when the vehicle seat backrest needs to be folded, the rotary spring 30 provides tension to fold the vehicle seat backrest by applying an external pressure in a direction from a vehicle seat head part direction to the vehicle seat support part. FIG. 2A is an enlarged view of a cross-section taken along line A-A of the seat frame for a vehicle as shown in FIG. 1. Referring to FIG. 2A, it can be identified that the flat spring 20 and the rotary spring 30 are disposed at each of the two opposite ends of the vehicle seat based on a horizontal direction. The flat spring 20 and the rotary spring 30 may be conveniently fixed and unfixed at each of the two opposite ends of the back frame 100 and disposed so that the flat spring 20 and the rotary spring 30 are easily repaired when the flat spring 20 and the rotary spring 30 are broken down.

The lever 300 may be disposed at an upper end of the vehicle seat. When the lever 300 operates, the back frame 100 is unfixed, and the vehicle seat is folded forward by operation of the rotary spring 30.

The lever 300 is referred to as an easy-entry lever 300. When the lever 300 operates, a recliner lock is released primarily, and the back frame 100 is folded. When the vehicle seat is folded forward, a locking cable for a rail 200 is released, and the vehicle seat moves forward while sliding on the rail 200. After the back frame 100 is folded, a rail 200 lock for fixing the rail 200 to prevent the rail 200 from moving secondarily is released, such that the vehicle seat slides forward.

The seat frame further includes the rail 200 provided on the lower end of the vehicle seat and configured to allow the vehicle seat to slide and move forward when the vehicle seat is folded forward. The rail 200 refers to a device disposed at the lower end of the vehicle seat and configured to move the vehicle seat forward or rearward. The rail 200 enables the driver or passenger to adjust the vehicle seat suitable for his/her body type. In addition, the driver or passenger may use the rail 200 lock to fix the vehicle seat so that the vehicle seat does not sway forward or rearward.

During the process of restoring the vehicle seat to the initial position, the back frame 100 slides the vehicle seat rearward on the rail 200. When the rail 200 is stopped, the vehicle seat is restored rearward.

During the process of restoring the vehicle seat to the initial position, a restoring force needs to be applied to the back frame 100 to restore the vehicle seat to the initial position. In this case, the rotary spring 30 and the flat spring 20 allow the rail 200, which has a relatively low restoring force, to slide rearward and be stopped. In the state in which the rail 200 is fixed after the rail 200 is stopped, the back frame 100 is restored rearward and fixed. Therefore, it is possible to prevent a situation in which the folding moment of force of the rotary spring 30, which is applied to fold the back frame 100 forward, is insufficient, and the back frame 100 is restored rearward and fixed and the rail 200 is fixed before the rail 200 is restored to the initial position.

In the case of the easy entry system, the rail 200 lock is released by a locking system cable of the rail 200 connected to the back frame 100 during the process of folding the back frame 100, such that the rail 200 may slide after the back frame 100 is folded. Therefore, it is possible to improve the convenience by preventing the back frame 100 from being restored rearward and fixed when the easy entry operation is performed in the state in which the vehicle is placed on a slope.

In addition, the flat spring 20 is disposed at the lower end of the back frame 100. The flat spring 20 may fix the back frame 100 by means of the slider 10 provided on the lower surface of the back frame 100 so that the vehicle seat is prevented to be restored rearward when the vehicle seat is folded forward.

FIG. 3 is a view illustrating the flat spring 20 and the slider 10 for fixing the back frame 100. In addition, FIG. 5 is a view illustrating a load applied to the slider 10 and the back frame 100 while the vehicle seat is folded.

The flat spring 20 is provided at the lower end of the back frame 100 and disposed between the vehicle seat backrest and the vehicle seat support part. Like the rotary spring 30, the flat spring 20 may assist in folding the back frame 100 and fix the back frame 100 so that the vehicle seat backrest may be in close contact with the vehicle seat support part. The back frame 100 is folded at the same time when the slider 10 provided on the lower surface of the back frame 100 slides while passing over the flat spring 20. When the slider 10 reaches a fixing part 22 of the flat spring 20, the back frame 100 may be folded and fixed. FIG. 5 shows a view before the insertion of the slider 10 and a view after the insertion of the slider 10. A load applied to the slider 10 or the back frame 100 varies depending on a profile shape of the slider 10 and a profile shape of the flat spring 20 during the easy entry operation. When the slider 10 is inserted into the fixing part 22 of the flat spring 20, a contact angle (a) of a profile of a sliding surface is set up so that a resistive force, which is lower than a folding force applied by the slider 10, is generated by the flat spring 20. The folding force is determined by a load of the rotary spring 30 and a load of the back frame 100. A contact angle (b) is set up so that an operating force of the rail 200 is further increased so that the rail 200 may be restored first when the back frame 100 is fixed or the easy entry is restored after the slider 10 is inserted. In this case, a sum of the load of the rotary spring 30 and the locking force of the flat spring 20 becomes higher than the operating force of the rail 200.

More specifically, referring to FIGS. 3 and 5, the flat spring 20 may include a sliding part 21 on which the slider 10 moves, and the fixing part 22 to which the slider 10 is fixed. The flat spring 20 may have the shape including the sliding part 21 and the fixing part 22, such that the slider 10 may move on the sliding part 21, and the slider 10 may move and be fixed to the fixing part 22.

FIG. 4 is a view illustrating the flat spring 20 and the slider 10 before, while, and after the vehicle seat is folded forward. Referring to FIG. 4, before the vehicle seat is folded forward, the flat spring 20 is spaced apart from the slider 10 and does not fix the back frame 100. Before the back frame 100 is folded, a gap between the slider 10 and the flat spring 20 is ensured, such that a spring force of the flat spring 20 is not applied in a reclining section.

In addition, the back frame 100 may fold the vehicle seat forward as the slider 10 rotates counterclockwise on the sliding part 21. During the process of folding the back frame 100, the slider 10 positioned at the front side moves to the rear side of the back frame 100 while rotating counterclockwise.

On the fixing part 22 formed at one side of the flat spring 20, the slider 10 moves along the sliding surface of the flat spring 20 while the back frame 100 is folded by the rotary spring 30. In this case, the resistive force generated by the flat spring 20 may have a value smaller than a value of the folding moment of force generated by the rotary spring 30 so that the slider 10 is inserted into the fixing part 22.

The fixing part 22 may fix the back frame 100 so that the slider 10 is fixed, and the vehicle seat is prevented to be restored rearward. In this case, when the slider 10 is fixed to the fixing part 22, the slider 10 may be seated on the fixing part 22 having a ring shape to fix the back frame 100. When the slider 10 is inserted into the fixing part 22 and the back frame 100 is fixed, the back frame 100 may be kept in a fixed state at an easy entry position by the load of the rotary spring 30 and the load of the flat spring 20.

As a result, the seat frame for a vehicle may prevent the back frame 100 from being restored rearward and fixed during the easy entry operation in the state in which the vehicle is placed on a slope, thereby improving performance in making it easy for a rear seat passenger to get in or out of the vehicle. In addition, it is possible to improve the performance of the easy entry system by preventing the situation in which the recliner is restored first during the restoring process. Further, the seat frame may be applied in common to the frames, to which the easy entry is applied, without changing the structure of the easy entry module and the structure of the back frame.

While the specific embodiments of the present invention have been illustrated and described above, it will be obvious to those skilled in the art that the present invention may be variously modified and changed without departing from the technical spirit of the present invention defined in the appended claims.

What is claimed is:

1. A seat frame for a vehicle, the seat frame comprising:
a back frame disposed on a vehicle seat and including a rotary spring disposed at a lower end of the back frame, the rotary spring being configured to fold the vehicle seat forward when a lever operates; and
a flat spring disposed at the lower end of the back frame and including a slider disposed on a lower surface of the back frame, the slider being configured to fix the back frame to prevent the vehicle seat from being restored rearward when the vehicle seat is folded forward,
wherein the flat spring includes:
a sliding part configured to have the slider move thereon; and
a fixing part configured to insert and lock the slider therein when folding of the vehicle seat is completed, and
wherein a first contact angle between a first moving direction of the slider and the fixing part is greater than a second contact angle between a second moving direction of the slider and the sliding part.

2. The seat frame of claim 1, wherein the fixing part has a ring shape.

3. The seat frame of claim 1, wherein the back frame is configured to fold the vehicle seat forward as the slider rotates counterclockwise on the sliding part.

4. The seat frame of claim 1, wherein the fixing part is configured to fix the back frame by fixing the slider in the fixing part so that the vehicle seat is prevented from being restored rearward.

5. The seat frame of claim 1,
wherein the lever is disposed at an upper end of the vehicle seat, and
wherein the back frame is configured to be unfixed when the lever operates, and the vehicle seat is configured to be folded forward by operation of the rotary spring.

6. The seat frame of claim 1, further comprising:
a rail disposed at a lower end of the vehicle seat and configured to allow the vehicle seat to slide and move forward when the vehicle seat is folded forward.

7. The seat frame of claim 6, wherein a locking cable of the rail is configured to be released when the vehicle seat is folded forward, and the vehicle seat is configured to move forward while sliding on the rail.

8. The seat frame of claim 1, wherein the flat spring is configured to be spaced apart from the slider and thereby have the back frame unfixed before the vehicle seat is folded forward.

9. The seat frame of claim 6,
wherein the back frame is configured to move and slide the vehicle seat rearward on the rail when the vehicle seat is restored to an initial position, and
wherein the vehicle seat is configured to be restored rearward when the vehicle seat is stopped on the rail.

* * * * *